United States Patent [19]

Speer et al.

[11] Patent Number: 5,008,223

[45] Date of Patent: Apr. 16, 1991

[54] GRAYISH-BLACK ENCAPSULATED PIGMENTS AND METHOD OF THEIR PRODUCTION

[75] Inventors: Dietrich Speer, Hanau; Akos Kiss, Wasserlos; Peter Kleinschmit, Hanau; Juergen Hanich, Frankfurt am Main, all of Fed. Rep. of Germany

[73] Assignee: Degussa Aktiengesellschaft, Frankfurt am Main, Fed. Rep. of Germany

[21] Appl. No.: 487,295

[22] Filed: Mar. 2, 1990

[30] Foreign Application Priority Data

Mar. 3, 1989 [DE] Fed. Rep. of Germany ....... 3906818

[51] Int. Cl.$^5$ ............................ C09C 1/62; C09C 1/48
[52] U.S. Cl. ..................................... 106/450; 106/472; 106/474; 106/475; 427/215
[58] Field of Search ............... 106/450, 472, 474, 475; 427/215; 241/23

[56] References Cited

U.S. PATENT DOCUMENTS

| | | | |
|---|---|---|---|
| 3,488,204 | 1/1970 | Jordan et al. | 106/450 |
| 4,482,390 | 11/1984 | Airey et al. | 106/450 |
| 4,788,080 | 11/1988 | Hojo et al. | 427/215 |
| 4,874,433 | 10/1989 | Kiss et al. | 106/450 |

Primary Examiner—Mark L. Bell
Assistant Examiner—Deborah Jones
Attorney, Agent, or Firm—Beveridge, DeGrandi & Weilacher

[57] ABSTRACT

The grayish-black encapsulated pigments contain carbon black particles with specific surface areas of 10 to 1000 m$^2$/g (BET) encapsulated in colorless crystals of zirconium silicate. In order to produce the pigments, mixtures of zirconium oxide with a particle size distribution (D50 values) between 7 and 10 μm and a spec. surface between 2 and 4 m$^2$/g, silicon oxide, carbon black and mineralizers are heated under reducing conditions to 900° to 1400° C. and calcined for 0.5 to 8 hours and recalcined under oxidizing conditions to remove the non-included carbon black. The encapsulated pigments of the invention are suitable for the pigmented coloration of glazes.

8 Claims, No Drawings

GRAYISH-BLACK ENCAPSULATED PIGMENTS AND METHOD OF THEIR PRODUCTION

INTRODUCTION AND BACKGROUND

The present invention relates to grayish-black encapsulated pigments based on zirconium silicate as the casing substance into which colored compounds are encased as a discrete phase. The present invention also relates to a method of producing these encapsulated pigments.

Encapsulated pigments or inclusion pigments have become known, in the prior art as, for example, from DE-PS 23 12 535. They consist essentially of transparent crystals of glaze-stable substances such as e.g. zirconium silicate, zirconium oxide or tin oxide into which inorganic, moisture-free, colored compounds are included or encapsulated as a discrete phase. Thenard's blue (cobalt blue), titanium yellow and especially cadmium yellow and cadmium red are examples of colored compounds. Zirconium iron rose with $Fe_2O_3$ inclusions in a zirconium silicate casing is also known.

The production of these encapsulated pigments takes place by means of heating the casing substances or their precursors and the colored substances to be included or their precursor compounds in the presence of one or more mineralizers to temperatures up to 1200° C. However, it was found that not all conceivable colored compounds can be encapsulated into the casing substances in an appreciable yield with this prior method.

The palette of grayish-black colors is not very large. Gray and black bodies are obtained essentially from iron oxides and chromium oxides, optionally in combination with other oxides such as e.g. manganese oxide, copper oxide, nickel oxide or cobalt oxide. Grayish-black encapsulated pigments were not known in the past.

SUMMARY OF THE INVENTION

An object of the present invention therefore is to provide grayish-black encapsulated pigments consisting essentially of colorless crystals of zirconium silicate in which colored compounds are encapsulated as a discrete phase. Another object is to provide a method of producing these encapsulated pigments with which a relatively high yield can be achieved.

A feature of the invention whereby the above and other objects are obtained resides in carbon black particles with specific surface areas (according to BET) of 10 to 1000 $m^2/g$, preferably 30 to 120 $m^2/g$, which are encased as the colored compounds. The carbon blacks can be of differing origin, such as e.g. so-called gas blacks, furnace blacks or lampblacks.

These pigments exhibit a gray to black color and different color nuances or shades can be the result of varying amounts as well as varying origin and particle sizes of the encapsulated carbon black particles.

The new grayish-black encapsulated pigments can be obtained by grinding and subsequently calcining a mixture of silicon dioxide, zirconium oxide, and the colored compound to be encapsulated along with conventional mineralizers at 900° to 1400° C. The method of the invention is characterized in that zirconium oxide is used with a particle size distribution (D50 value) of 7 to 10 $\mu$m and a specific surface area (geometrically determined) between 2 and 4 $m^2/g$. As the colored compound to be encapsulated, carbon black is used with a specific surface area (according to BET) of 10 to 1000 $m^2/g$ in an amount up to 50% by weight relative to zirconium silicate obtainable from the $SiO_2$ and $ZrO_2$ present. The resulting ground mixture is heated first under reducing conditions to 900° to 1400° C., calcined there for 0.5 to 8 hours and then calcined at 900° to 1400° C. under oxidizing conditions for removal of the non-encapsulated portion of carbon black.

Preferably, carbon blacks are used with specific surface areas between 30 and 120 $m^2/g$, determined according to the BET method using nitrogen (DIN 66131). They are conventional carbon blacks like those obtainable commercially as coloring or inking blacks or rubber blacks. Such carbon blacks generally exhibit an average primary particle size according to DIN 53206 in a range of approximately 10 to 100 nm. The carbon blacks are preferably added in amounts of 20 to 25% by weight based on the amount of zirconium silicate. The agglomerate size (determined by granulometry in water) of the carbon black particles used by way of example was between 1 and 15 $\mu$m; this size range is not essential for the invention. The specific surface area of the zirconium oxides to be used was determined geometrically from the particle size distribution.

The heating rate is preferably between 800° and 1000° C./hour; however, heating rates of e.g. 200° to 800° C./hour were also successful. The optimum heating rate also depends partially on the calcining furnace available. A calcination temperature between 1000° and 1300° C. is preferred.

Customary mineralizers as are well known in the art can be used such as alkali metal halogenides or alkaline earth metal halogenides, preferably alkali metal fluorides and alkaline earth metal fluorides, especially magnesium fluoride, and alkali metal silicofluorides. One or more of such mineralizers can be used.

Zirconium oxide and silicon dioxide are used in essentially equivalent amounts. The mixture to be calcined is ground prior to the calcining process, e.g. in a ball mill or in other intensive grinding mills. The calcination can take place in conventional furnaces such as e.g. in piston furnaces (furnace for getting the product to be calcined heated up within the shortest time), chamber furnaces or tunnel furnaces. Furnace conditions as well as compressing conditions are well known. At a calcining temperature of 1000° C., a dwell time of one hour is usually sufficient. Gray to black products are obtained in this manner with a yield of approximately 80% relative to the theoretically possible formation of $ZrSiO_4$. In order to remove the carbon black portion which was not encapsulated after the reducing calcination operation, an oxidizing recalcination is carried out. The oxidizing calcination takes place at 900° to 1400° C. whereby a calcining time of 0.5 to 1 hour is generally sufficient at 1000° C. The encapsulated pigments produced in accordance with the invention contain more than 0 and less than 0.5% by weight carbon black included.

These colored bodies are distinguished in the Lab color system by color-neutral gray tones (a and b values near zero), their non-toxicity and by low production costs. They are splendidly suitable for the pigmentation coloration of glazes.

DETAILED EMBODIMENTS OF THE INVENTION

The following examples are intended to explain the method of the invention in more detail:

EXAMPLE 1

A mixture consisting of 26 g zirconium oxide (D50 value=7.6 m; spec. surface area=3.1 m$^2$/g), 13.8 g silicon dioxide, 5 g carbon black (lampblack, spec. surface area approximately 24 m$^2$/g, primary particle size approximately 95 nm, D50 value 3.0 μm) with 5 g magnesium fluoride as mineralizer is calcined after a 15-minute grinding in crucibles covered by a layer of sugar and a crucible cover for one hour at 1000° C. in a piston furnace. The heating rate was 950° C./hour. The comminuted product was subsequently heated 1 hour at 1000° C. in air. The gray product exhibited an L value of 64.2 (L=brightness value; 100=white, 0=black).

EXAMPLE 2

A mixture consisting of 26 g zirconium oxide (as in example 1), 13.8 g silicon dioxide, 10 g carbon black (furnace black, spec. surface area 120 m$^2$/g, primary particle size approximately 20 nm, D50 value 15 μm) and 2.5 g magnesium fluoride is calcined as in example 1. A gray product with an 20 L value of 52.8 is obtained.

EXAMPLE 3

A furnace black with a specific surface area of approximately 60 m$^2$/g, primary particle size approximately 40 nm, D50 value 1.3 μm is used in an analogous manner with example 2. The product had an L value of 51.0.

EXAMPLE 4

A furnace black with a specific surface area of approximately 25 m$^2$/g is used in a batch according to example 2. Piston furnace: Heating rate 950° C./hour, calcination temperature 1000° C., holding time 1 hour, oxidative recalcining at 1000° C. The product had an L value of 49.2.

EXAMPLE 5

A zirconium oxide with a D50 value of 9.3 μm and a specific surface area of 2.1 m$^2$/g is used analogously with example 4 (furnace black=30 m$^2$/g, primary particle size approximately 50 nm, D50 value 1.0 μm). The product had an L value of 40.3. This pigment contained approximately 0.3% by weight carbon black included.

EXAMPLE 6

Example 4 was repeated, whereby a reducing calcining was performed in a batch furnace at 1300° C. Dark gray colored bodies were obtained at a heating rate of 500° C./hour with a holding time of 1 hour and an oxidative recalcining treatment at 1300° C.

Yields of approximately 80% were obtained in all these examples, based on the theoretical yield.

EXAMPLE 7

For comparison, zirconium oxide powders with a D50 value of 4 μm (spec. surface area 5.1 m$^2$/g,) with a D50 value of 14.6 μm (spec. surface area 1.8 m$^2$/g) and in an amorphous state were used. Under the same test conditions as in example 1, white products without carbon black encapsulated are obtained, since the particle size of the zirconium oxide powder used was outside of the particle size necessary for production in accordance with the invention.

Further variations and modifications of the foregoing will be apparent to those skilled in the art and are intended to be encompassed by the claims appended hereto.

We claim:

1. An encapsulated pigment ranging in color from gray to black consisting essentially of a transparent crystal of zirconium silicate into which colored compounds are encapsulated as a discrete phase, said colored compound being carbon black particles with a specific surface area (according to BET) of 10 to 1000 m$^2$/g.

2. The encapsulated pigment according to claim 1 which is grayish-black in color.

3. The encapsulated pigment according to claim 1 wherein said carbon black is present in the amount of more than 0 and less than 0.5% by weight.

4. A method for producing grayish-black encapsulated pigments comprising grinding silicon dioxide, zirconium oxide, a colored compound to be encapsulated and at least one mineralizer to form a ground mixture, calcining said mixture at 900° to 1400° C., wherein the zirconium oxide has a particle size distribution (D50 value) of 7 to 10 μm and a specific surface area (geometrically determined) between 2 and 4 m$^2$/g and, the colored compound to be encapsulated is carbon black with a specific surface area (according to BET) of 10 to 1000 m$^2$/g in an amount up to 50% by weight based on the weight of the zirconium silicate obtainable from the SiO$_2$ and ZrO$_2$ present, said calcining being conducted first under reducing conditions at 900° to 1400° C., for 0.5 to 8 hours and then calcined at 900° to 1400° C. under oxidizing conditions for removal of non-encapsulated portion of carbon black.

5. The method according to claim 4, wherein carbon black with a specific surface area of 30 to 120 m$^2$/g is used in an amount of 20 to 25% by weight based on the weight of zirconium silicate.

6. The method according to claim 4, wherein the calcining heating rate is 800° to 1000° C./hour and the calcining temperature is 1000° to 1300° C.

7. The method according to claim 4, wherein the carbon black has an average primary particle size of about 10 to 100 nm.

8. The method according to claim 4, wherein the yield is about 80%.

* * * * *